United States Patent [19]

Sainsbury

[11] Patent Number: 4,491,125
[45] Date of Patent: Jan. 1, 1985

[54] SOLAR COLLECTOR

[76] Inventor: Garrett M. Sainsbury, 10 Waratah Ave., Dalkeith, Western Australia, Australia

[21] Appl. No.: 518,803
[22] PCT Filed: Nov. 12, 1982
[86] PCT No.: PCT/AU82/00185
  § 371 Date: Jun. 21, 1983
  § 102(e) Date: Jun. 21, 1983
[87] PCT Pub. No.: WO83/01830
  PCT Pub. Date: May 26, 1983

[30] Foreign Application Priority Data

Nov. 17, 1981 [AU] Australia .............................. PF1592
Mar. 24, 1982 [AU] Australia .............................. PF3294

[51] Int. Cl.³ .............................................. F24J 3/02
[52] U.S. Cl. .................................... 126/424; 126/425; 126/439
[58] Field of Search ............... 126/424, 425, 438, 439, 126/422, 443, 442; 350/292, 294, 299, 298, 310

[56] References Cited

U.S. PATENT DOCUMENTS

| 3,295,512 | 1/1967 | McCusker | 126/451 |
| 4,084,581 | 4/1978 | Vigoureux | 126/438 |
| 4,195,620 | 4/1980 | Rust | 126/439 |
| 4,211,211 | 7/1980 | Toomey | 126/443 |

Primary Examiner—James C. Yeung
Attorney, Agent, or Firm—Harness, Dickey & Pierce

[57] ABSTRACT

A solar collector comprising a hemisphere (111) having a reflector internal surface; a caustical concentrator (116) located at the focus of the hemisphere (111) and having a concentrated second focus for radiation reflected onto its surface from said hemisphere, a heat exchanger (120) located at the second focus, said caustical conical concentrator (116) being mounted to rotate about a substantially North-South axis passing through said second focus and being driven by a drive such that with movement of the sun, incident solar radiation is constantly directed at said second focus.

12 Claims, 9 Drawing Figures

SOLAR COLLECTOR

BACKGROUND OF THE INVENTION

This invention relates to solar collectors and in particular a focussing solar collector.

Focussing collectors can be divided broadly into three systems.
(a) Troughs
(b) Dishes
(c) Heliostat/power tower combinations The first two systems can be further subdivided as follows:
Troughs
(a) Tracking on one axis.
(b) Tracking on two axes.
Dishes
(a) Parabolic
(b) Spherical The main problem with troughs is the relatively low maximum temperatures attainable because a line focus rather than a point focus is produced. This applies to both types although the second type is better in this regard than the first. Low temperatures cause heat transfer problems and give low thermodynamic efficiency. In endeavouring to overcome these problems by employing two axes tracking other complications arise namely extracting heat at high temperatures from the focus of a system which is swinging around as the sun is tracked. The hot, exotic heat transfer medium tends to leak past the seals in pipes undergoing relative movement. (The exotic heat transfer fluids are necessary because the pressure of steam at even the relatively low operating temperatures, typically 570° F., is 1,200 p.s.i., which is enough to cause a blow out). This is apart from the actual tracking problem—the rate of swing on the two axes cannot be preset as it varies for each axis during the day, being a maximum for the elevation axis and a minimum for the azimuth axis at dawn and the reverse at noon, then back to the dawn situation at sunset. Furthermore, the changing relationship between the two axial swings changes over successive 24 hour periods during the course of 12 months. The usual tracking method is to adjust the elevation and azimuth at frequent intervals during the day, this being accomplished automatically via input from sensors. However, this results in a jerky movement and a lot of the time an appreciable percentage of the reflected incident radiation misses the target.

Parabolic dishes produce a point focus resulting in high temperatures but they suffer the other disadvantages of two axes troughs, namely a swinging focus, leaky exotic heat transfer fluid lines (exacerbated by the higher temperature) and tracking problems (exacerbated by the generally bigger unit size and the greater precision required). In addition, it is expensive to fabricate and support a large parabolic dish—each panel in the dish is different to every other not on its particular "latitude zone".

Spherical dishes are an improvement in many respects. For instance they can be fabricated out of a large number of a few types of panels and the tracking requirements are simple. A spherical dish has an infinity of optical axis, as opposed to a paraboloid which has one so that even if completely immobile it is, in a sense, always perfectly aligned with the sun. An immobile dish of course would only receive a fraction of the total possible energy intake during the day so in practice the dish is tilted and rotated around a vertical axis through the centre of curvature so that it is facing in the general direction of the sun at all times during the day. The trade off for these advantages is the loss of the point focus—the "non paraxial" incident rays (ie; those parallel but at some distance from the optical axis) are reflected to points on the axis progressively further and further from the paraxial focus as they become more and more "non paraxial". In section the reflected rays form a caustic curve. The result is that in order to collect the reflected radiation a heat transfer fluid pipe must at all times be positioned coincident with the optical axis of the moment. In other words the system reverts to a low temperature line focus with a swinging target. In this instance the target swing is indepedent of the reflector and is relatively straight forward—it rotates around a North-South axis through the centre of curvature inclined at the latitude angle of the site at the same speed as the earth rotates with respect to the sun which is essentially constant at 15° per hour. It also swings on a second axis through the centre of curvature at right angles to the first axis to maintain the angle between the first axis and the pipe essentially equal to the declination of the sun as it changes with the seasons. This is known as an equatorial mounting and provides the simplest possible tracking.

The heliostat/power tower system is currently the most favoured in large solar power installations. It consists of a large central tower with an immobile target sitting on top. The tower is surrounded at ground level by a large number of plane reflecting surfaces which reflect sunlight to the target. This system has many inherent advantages but the tracking problem is multiplied by the number of individual reflectors used—each reflector has to track in elevation and azimuth and its attitude at any time is different to all the other reflectors. At least with two axes troughs and parabolic dishes all units have the same attitude at the same time—one unit can act as the master tracking unit which all the others follow using the servo principal.

Obviously one system is required that incorporates the good points of the various existing systems without the problems.

The desirable attributes are:
(a) Point focus
(b) Immobile target (allowing direct generation of steam without the use of an intermediate exotic heat transfer fluid and a steam generator).
(c) Ease of construction
(d) Simple tracking It has been found that this could be achieved by introducing a secondary reflecting surface into a spherical dish system which gives the spherical dish a point focus at the centre of curvature.

SUMMARY OF THE INVENTION

In one form the invention relates to a solar collector comprising a hemisphere having a reflective internal surface; a caustical conical concentrator located at the focus of the hemisphere and having a concentrated second focus for radiation reflected onto its surface from said hemisphere, a heat exchanger located at the second focus, said caustical conical concentrator being mounted to rotate about a substantially North-South axis passing through said second focus and being driven by a drive such that with movement of the sun, incident solar radiation is constantly directed at said second focus.

According to a preferred feature of the invention, the second focus is located at the centre of curvature of the hemisphere.

According to a preferred feature of the invention, the hemisphere is inclined at an angle from the horizontal substantially equal to the angle of latitude of the location of the solar collector.

According to a preferred feature of the invention the North-South axis is inclined at an angle to the horizontal substantially equal to the latitude of the location of the solar collector.

According to a preferred feature of the invention said hemisphere is rotatable about said North-South axis.

According to a further preferred feature of the invention the hemisphere is inclined at an angle from the horizontal substantially equal to the angle of latitude of the location of the solar collector and the lower portion of the hemisphere is fixed while the upper portion can rotate over the lower portion a second drive being associated with the upper portion to move said upper portion such that said hemisphere is substantially constantly directed towards the sun during its movement.

According to a further preferred feature of the invention, said caustic conical concentrator is rotatable about an East-West axis and is capable of being driven by a third drive to maintain the caustical conical concentrator at said first focus as the sun varies its declination.

According to a further preferred feature of the invention the caustical conical concentrator is associated with a sensor located adjacent the light path between the caustical conical concentrator and the second focus to cause activation of the drives for said caustical conical concentrator on said light path intersecting said sensor.

According to a preferred feature of the invention the collector is spherical and the other hemisphere thereof is substantially transparent.

According to a preferred feature of the previous feature, the caustical conical concentrator is associated with a refractive and/or reflective concentrator mounted to the other side of the second focus in opposed relation to the caustical conical concentrator and mounted to move in opposed relation with the caustical conical concentrator and having as its focus the second focus.

According to a preferred feature of the invention the collector is spherical and is formed by a flexible membrane inflated to maintain its shape.

According to a preferred feature of the invention, the collector is spherical and is formed of two hemispheres of rigid plastics material interconnected by a rigid circular frame supported by said diametric axial member.

BRIEF DESCRIPTION OF THE DRAWINGS

The invention will be more fully understood in the light of the following description of several specific embodiments. The description is made with reference to the accompanying drawings of which.

DETAILED DESCRIPTION OF THE PREFERRED EMBODIMENTS

Figure 1:
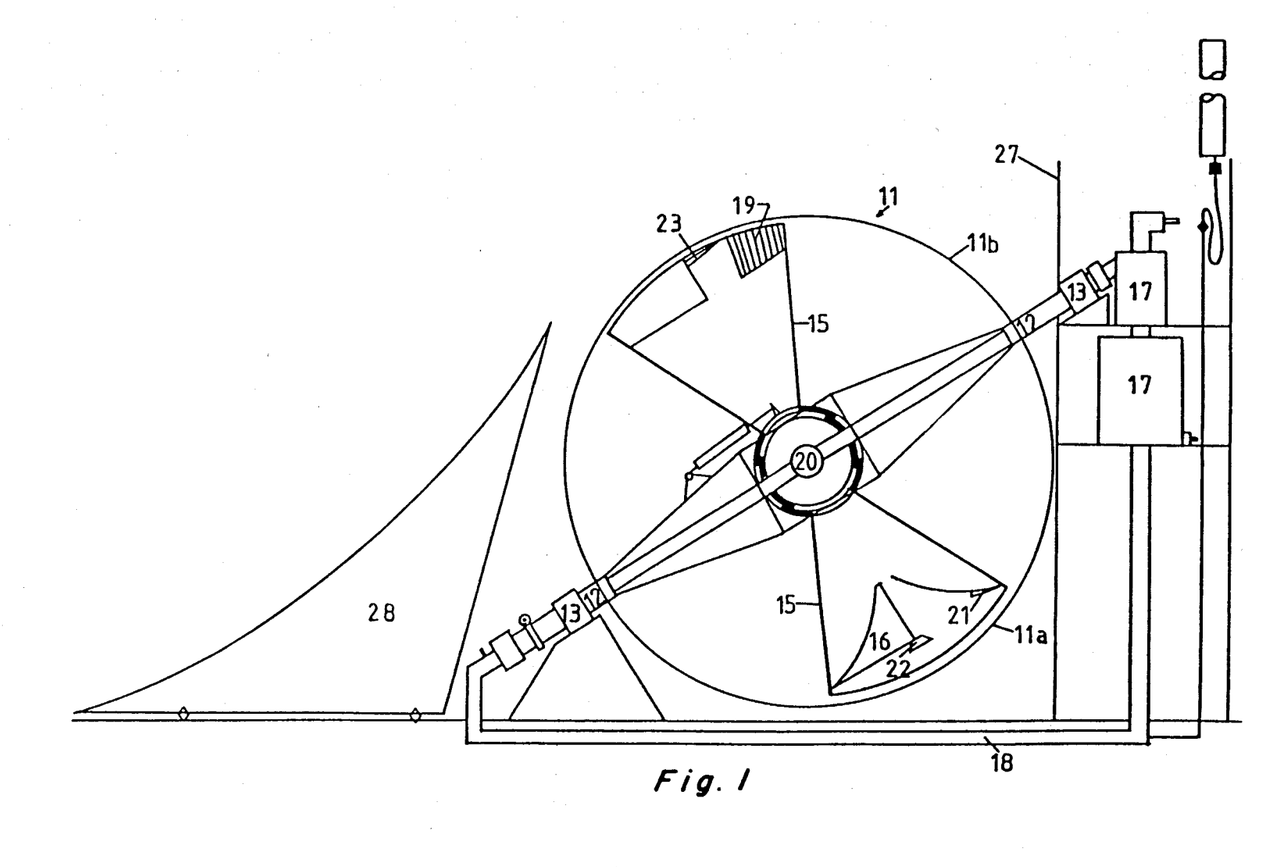
FIG. 1 is a schematic sectional elevation of the first embodiment.

The embodiment of FIG. 1 comprises a solar collector comprising a spherical shell 11 formed from an inflated flexible membrane. The shell comprises one hemisphere 11a having a reflective inner face, the other hemisphere 11b is substantially transparent. The shell is supported on a diametric shaft 12 having a substantially North-South orientation and extending between the junctions of the hemispheres and is inclined at an angle to the horizontal substantially equal to the latitude of the location of the collector. Each end of the shaft 12 is pivotally supported in suitable bearings 13 and is driven by a drive motor to cause the sphere to revolve about the central axis of the shaft. The drive for said motor is controlled such that the reflective hemisphere is directed constantly towards the sun. At the end of each day the sphere is caused to revolve to a position at which the reflective hemisphere 11a will be directed towards the sun when it rises the following day. The drive for the motor may be controlled by a suitable sensor to maintain the reflective hemisphere in position or alternatively may be calibrated according to the suns predicted movement.

The diametric shaft 12 supports a diametric frame 15 substantially perpendicular to the shaft 12 and rotatable about the centre of curvature of the sphere about a North-South axis (principal axis) and an axis perpendicular thereto (swing axis) to ensure that the diametric frame remains in alignment with the sun as it moves across the sky and varies its angle of declination respectively. One end of the diametric frame 15 adjacent the reflective hemisphere 11a supports a reflective caustical conical concentrator 16 which is located at the focus of the reflective hemisphere. The curvature of the caustical conical cone is such that solar radiation incident thereon from the reflective hemisphere is reflected to a substantially point focus at the centre of curvature of the hemisphere. The pivotal movement of the diametric frame 15 on the diametric shaft 12 is controlled by a hydraulic means which is in turn controlled by a suitable sensor to maintain the radiation reflected from the caustical cone 16 incident upon the centre of curvature of the hemisphere.

A spherical heat exchanger 20 is located at the point of focus and heat exchange fluid is introduced to and extracted from the heat exchanger by means of fluid lines located within the shaft 12. The heated fluid from the heat exchanger passes to a means 17 for extracting the heat from the fluid which is then returned to the heat exchanger by a return conduit 18.

The other end of the diametric frame remote from the caustical conical concentrator supports a lens 23 which directs the solar radiation incident thereon onto the heat exchanger 20. The other end also supports an annular array of concentric parabolic reflectors 19 which shadows the caustical cone from incident solar and reflects the incident radiation onto the heat exchanger 20.

The underside of the caustical conical concentrator is formed at its outer periphery with an annular convex reflecting surface 21 which reflects radiation reflected from the hemisphere to a small reflective cone 22 located centrally below the caustical conical concentrator 16. The apex of the caustical conical concentrator is cut away to permit radiation reflected from the small reflective cone 22 to be incident onto the heat exchanger 20.

Figure 2:
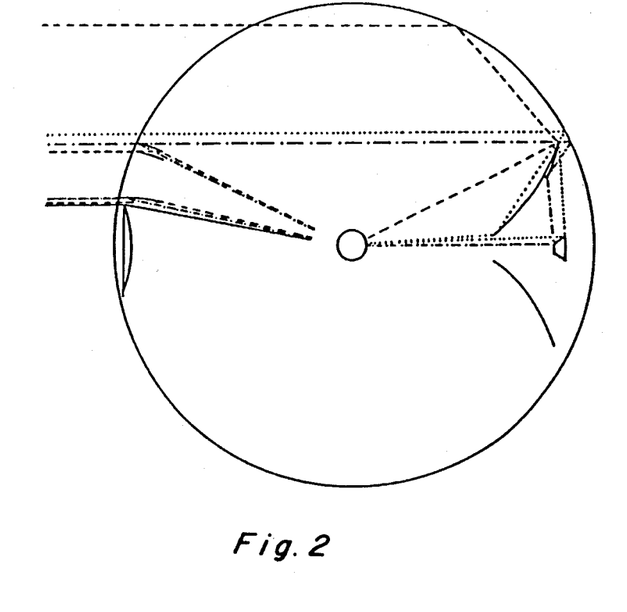
FIG. 2 shows a ray trace of solar radiation incident on the collection of FIG. 1.

The path of the solar radiation incident on the collector of the embodiment may be more fully understood by reference to FIG. 2.

As shown at FIG. 1, when in position the collector is associated with a support structure 27 which supports the upper end of the shaft and accommodates the appropriate equipment for extraction of the heat from the heat exchange fluid and for controlling the movement of the collector. In addition, the concentrator is associated with a wind deflector 28 which surrounds the lower portion of the collector to protect it from distortion and damage due to wind.

The construction of the spherical shell may be effected by construction of a set of suitably shaped panels formed from a desirable flexible membrane and interconnected them by any desired technique.

Figure 3:
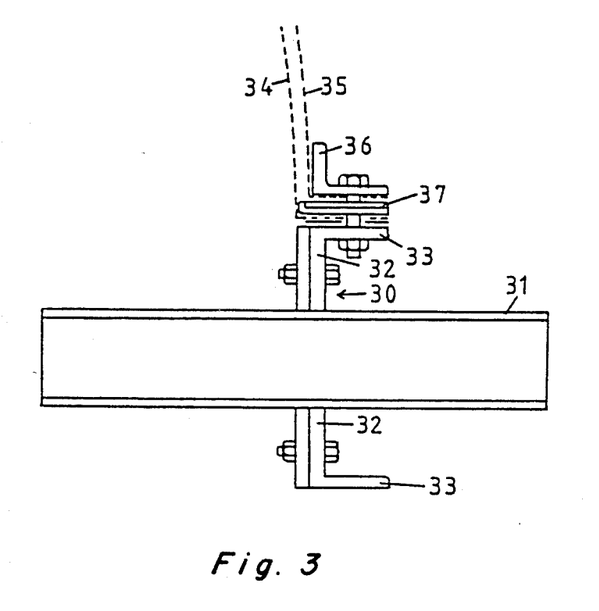
FIG. 3 is a part sectional elevation showing the construction of the shell of the second embodiment.

The second embodiment differs from the first embodiment only in relation to the nature and method of construction of the spherical shell. The shell of the second embodiment comprises a circular frame member 30 which is fixed to the diametric shaft 31. The circular frame member 30 supports a pair of hemispheres formed of a rigid plastics material. The circular frame 30 is formed from a circular channel section 32 where each flange 33 supports a pair of membranes 34 and 35 which extend across the circular frame 30 and are clampingly mounted at their periphery to the respective flange 33 of the frame by means of circular angle members 36. A circular spacer 37 is located between each membrane. In forming each hemisphere after each membrane is fixed to the circular frame 30, a quantity of acrylic resin and catalyst is mixed and injected into the space between each pair of membranes to fill the space therebetween. During the filling step, air displaced by the incoming resin is permitted to escape. On completion of the filling step compressed air is introduced into the space defined by the circular frame 30 and membranes to inflate each set of membranes to a hemispherical shape. Pressure is maintained in the structure until the resin trapped between each pair of membranes has set hard. On completion of the forming step, one or both of the hemispheres can be removed to permit installation of the internal mechanism of the collector. If desired, the reflective surface of the reflective hemisphere may be formed by using a reflective material as the inner membrane 34 or by providing a suitable reflective coating to the inner surface after the forming process.

The concentrator of the third embodiment of FIGS. 4 to 9 consists of a hemispherical reflector 111 with its open diametric face inclined to the horizontal at an angle equal to the latitude of the site. The reflector is set in the ground slightly deeper than its lowest edge and the part of the reflector above ground level (the shell 11A) is separate from the part in the ground (the bowl 111B) and can revolve around a vertical axis through the centre of the hemisphere.

Figure 4:
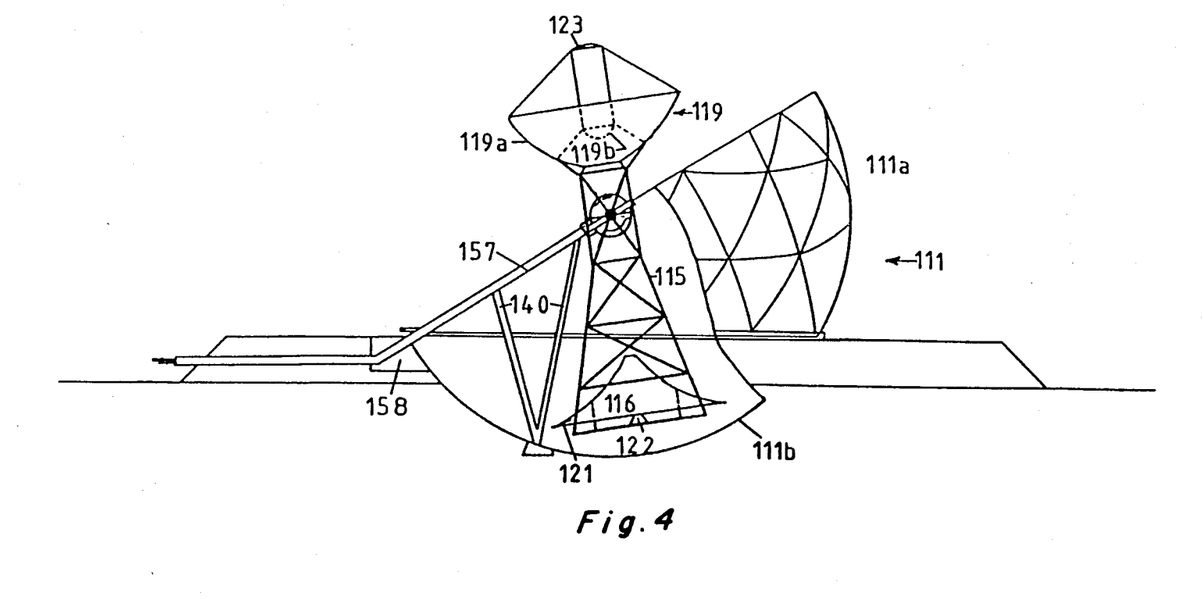
FIG. 4 is a schematic sectional elevation of the third embodiment.

A spherical boiler 120 is located at the centre of the hemisphere 111 with an insulated water inlet pipe leading into it and an adjacent insulated steam outlet pipe leading out of it. The pipes are inclined above the horizontal at an angle equal to the latitude of the site and are aligned North-South and pass out of the hemisphere slightly below ground level. The line of contact between the pipes is co-incident with the North-South diametric axis (the principal axis) across the face of the hemisphere 111. At ground level the pipes are fixed by a concrete collar which surrounds the hemisphere and are supported above the hemisphere by suitable columns and struts 140.

The boiler 120 is surrounded by a diametric truss 115 which can rotate around the principal axis and also swing on an axis coincident with the East-West diametric axis of the hemisphere (the swing axis). A reflecting caustic correction cone 116 is located at one end of the truss adjacent the reflective face of the hemisphere 111 and a parabaoloid/hyperboloid combination 119 (a counterweight collector) at the other end. The curvature of the caustic correction cone 116 is such that solar radiation reflected from the hemisphere will impinge on the cone 116 and is reflected to the central boiler 120. The cone is shadowed from direct radiation from the sun by the annular paraboloid reflector 119A which reflects the radiation to a central hyperboloid reflector 119B which in turn reflects the radiation through the centre of the annular paraboloid 119A to the central boiler 120.

The boiler 120 is surrounded by a spherical heat shroud 141 which rotates with the truss. Radiation from the cone and the counterweight collector passes through fused silica covered slots 142 in the shroud to the boiler 120. The space between the boiler 120 and shroud 141 is evacuated and the interior of the opaque portion of the shroud 141 is silvered.

In operation the axis of the truss 115 supporting the cone 116 and counterweight collector system 119 is kept aligned with the centre of the sun during the course of the day. This is done by rotating the truss 115 about the principal axis at a speed equal to the rate of rotation of the earth with respect to the sun and maintaining the angle between the principal axis and the cone counterweight axis essentially equal to the declination of the sun by periodically swinging the truss on the swing axis. The movements are accomplished automatically by motors and solenoids responding to signals from a sensor which detects any misalignment. During the course of the day the shell 111A is periodically traversed on rollers around the horizontal rim of the bowl 111B so that it is essentially facing the sun at all times. In this manner most of the radiation impinging on the collector is concentrated at the central boiler 120 which remains immobile at all times.

Water is pumped into the boiler 120 by a circulating pump 143 attached to a central steam accumulator 150 (see FIG. 8) and steam from the boiler discharges into the steam accumulator 150. A first group of concentrators A are served by the steam accumulator 150. Steam from the accumulator is drawn off and passed at constant pressure through a second group of concentrators B where it is super-heated before utilisation in a turbine/alternator sub-system 144. After partial expansion in the turbine some steam can be drawn off and reheated in a third group of concentrators C. The three groups of concentrators constitute a collector field which acts as a supplementary source of heat to a fossil fuel fired steam turbine power station.

Figure 6:
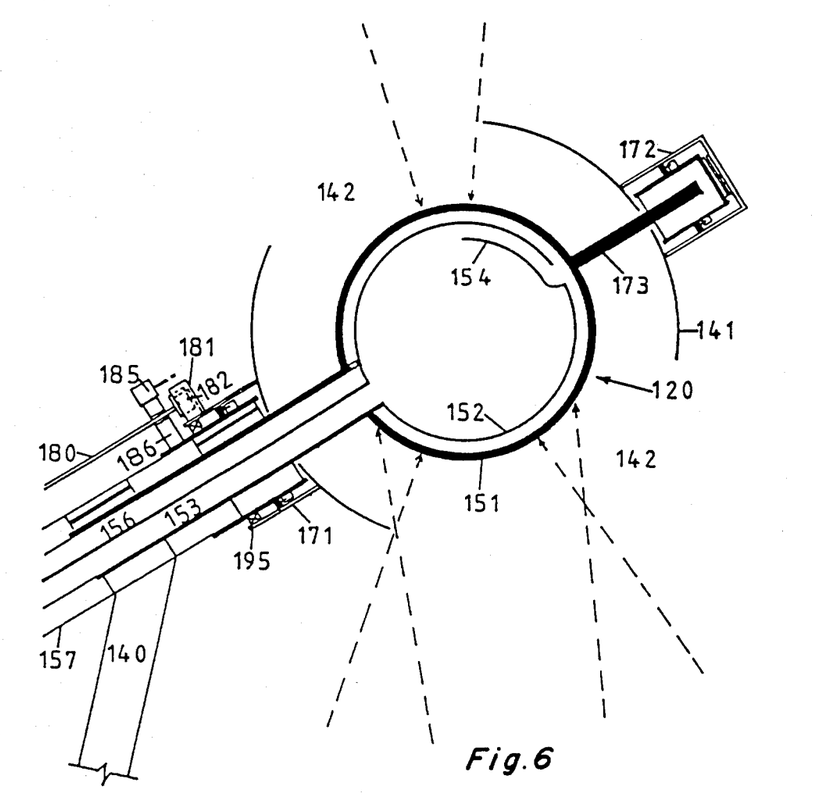
FIG. 6 is a part sectional elevation of the third embodiment showing the boiler configuration.

As shown at FIG. 6, the boiler 120 is located at the centre of the hemisphere and consists of an outer spherical shell 151 and a concentric inner spherical shell 152 with a gap between the two shells. A straight water inlet pipe 153 passes through the outer shell 151 and discharges into the inner shell 152. Steam discharges from the inner shell 152 into the space between the inner and outer shells at a point opposite the water inlet, via a short internal pipe 154 and is constrained by ribs between the inner and outer shell to travel in a spiral path to a point adjacent to the water inlet pipe 153 where it enters a steam outlet pipe 156 let into the outer shell. The steam outlet pipe 156 lies in contact with and parallel to the water inlet pipe 153. Both pipes are insulated and the insulation is jacketed by a jacket 157 which is set at its lower end in a concrete collar 158 surrounding the hemisphere at an inclination to the horizontal equal to the latitude of the site and has an orientation along the North-South axis. The fully insulated steam and water pipes pass through the collar 158 to a point outside the bank surrounding the bowl 111b where they connect into the field pipe system leading to the central steam accumulator (see FIG. 8). The centre line of jacket 157 is coincident with a diameter of the plane defined by the open face of the hemisphere 111 and the jacket 157 is supported by legs 140 and struts running back to the rim of the bowl on both sides (not shown).

Figure 5:
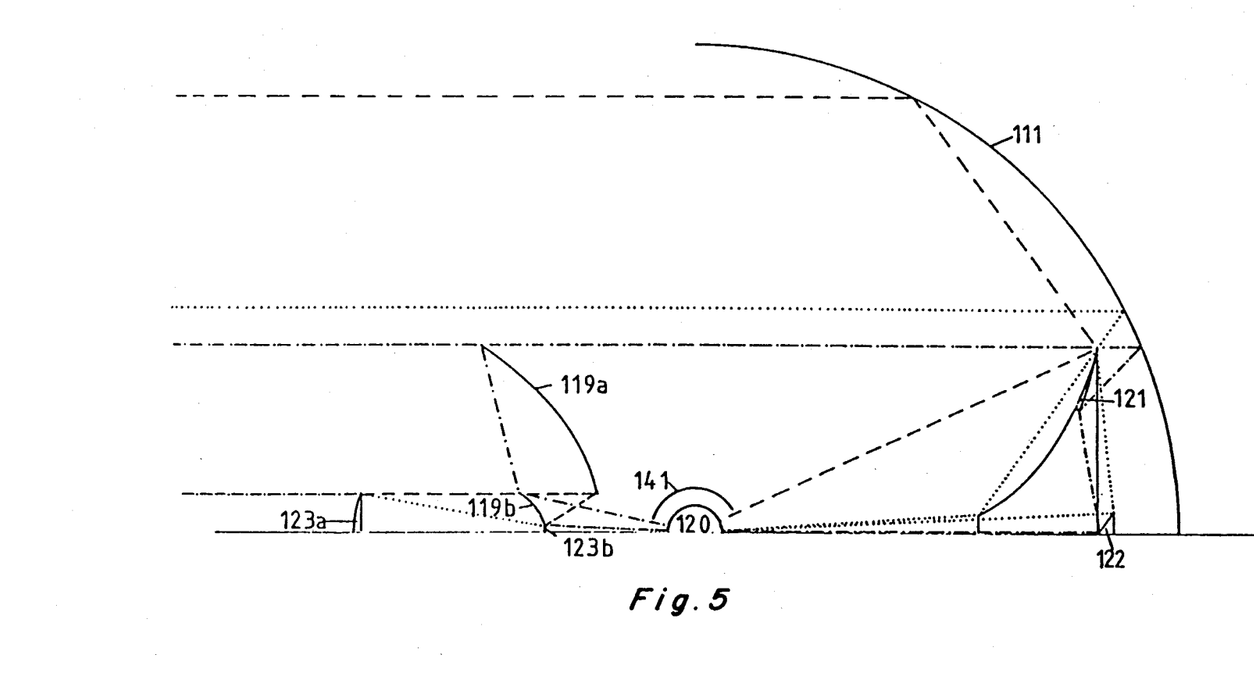
FIG. 5 is a ray trace applicable to the third embodiment.

As stated previously, in order to ensure that solar radiation reflected from the spherical surfaces of the bowl and shell impinge on the central energy receptor it is necessary to interpose a secondary reflecting surface, or caustic correction cone 116. The resultant ray path is shown in FIG. 5. The correction cone 116 collects all reflected radiation from an annular zone of the hemisphere between central angle 45.3° and central angle 127° which is the preferable size of the cone. Reflection from an appreciable annular zone of the hemisphere 111 concentric with the cone 116 impinges on the back of the cone 116 and to utilise this radiation an annular spherical reflecting surface 121 redirects it to a small plane sided axial cone 122 and hence to the central energy receptor as shown in FIG. 5. Solar radiation incident directly onto the face of the cone 116 would normally be dissipated but this is prevented by interposing a cassegrainian telescope type arrangement 119 ahead of the boiler 120 comprising a paraboloid reflector 119A which reflects primary radiation (ie; radiation direct from the sun) to hyperboloid reflector 119B and thence to the boiler 120. A convex lens 123a and concave lens 123b utilise radiation which would otherwise be blocked by the hyperboloid.

Figure 7:
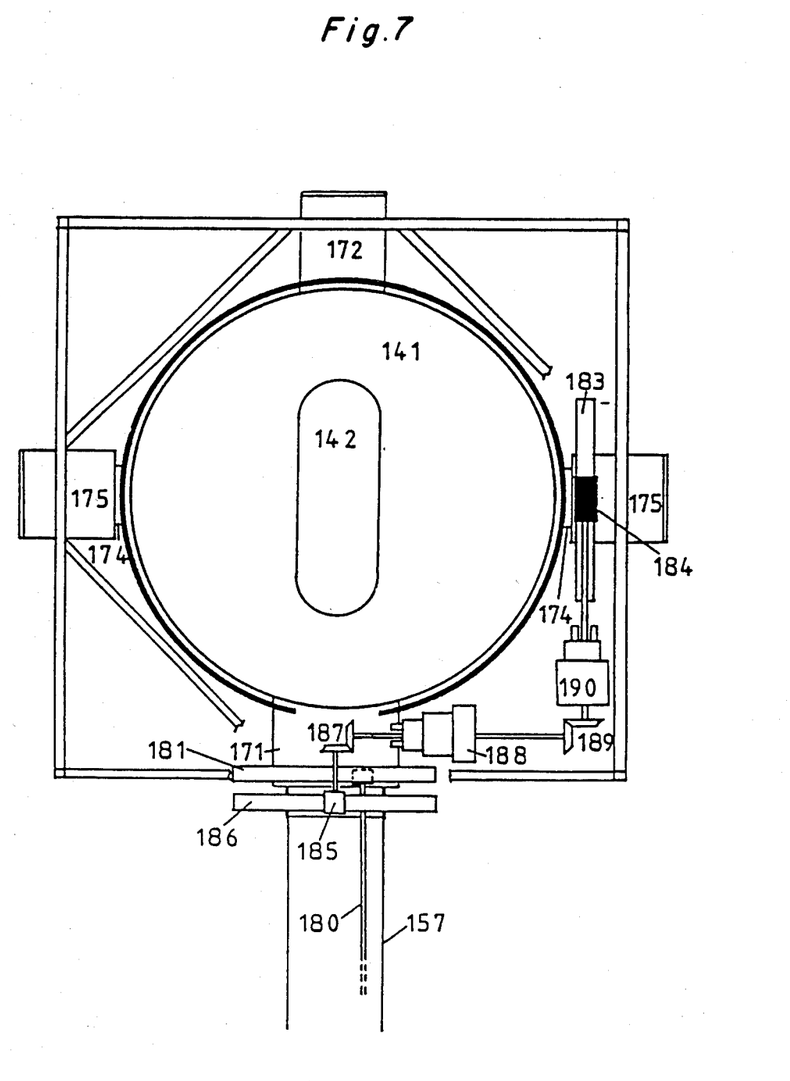
FIG. 7 is a part plan view of the third embodiment showing the truss mounting thereof.
Figure 8:
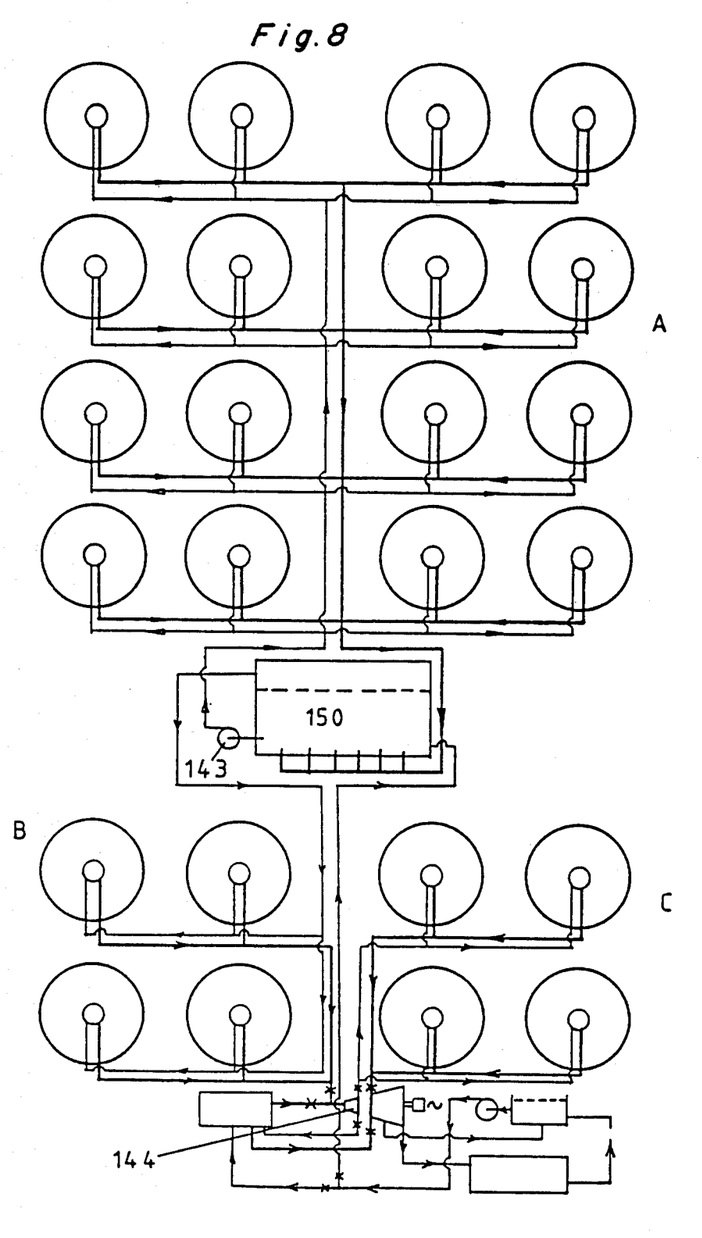
FIG. 8 is a schematic layout of an energy collection means utilising a bank of collectors according to the third embodiment.

As disclosed previously the caustic correction cone 116 and the cassegrainian arrangement 119 (with associated lenses) are mounted on opposite ends of truss 115 which can be swung on the swing axis corresponding to a diameter of the boiler 120 and at right angles to the centre line of the jacket 157. The truss 115 can also rotate about the principal axis corresponding to the centre line of jacket 157. The above movements are achieved by first providing a hoop 170 which surrounds the energy receptor and is supported by diametrically opposed sleeves 171 and 172. The lowermost sleeve 171 can rotate on bearings around the jacket 157 and the other sleeve 172 can rotate around an insulated pin 173 projecting from the receptor at the other end. A diametrically opposed pair of pins 174 project from the hoop 170 perpendicular to the jacket 157 and the truss swings on bearings 175 on these pins. This is a type of equatorial mounting and provides a simple means of keeping of the axis of the cone/cassegrainian system aligned with the sun at all times.

A single drive unit (not shown) on the concrete collar 158 at the edge of the bowl powers both rotation and swing movements and comprises a small electric motor equipped with an eddy current dynamometer type brake which drives the sun gear of an epicyclic gear train at practically no load and an identical motor similarly equipped which drives the annulus gear of the train. Depending on the relative speeds of the two motors (varied by the degree of braking up to full load) the carrier shaft of the train can be made to revolve at an appropriate slow rate either forwards or backwards. The carrier shaft drives through a double reduction worm gear box and a set of bevel gears, a drive shaft 180 running in bearings mounted on jacket 157. A pinion 182 on the end of the drive shaft 180 drives a 180° internal gear wheel 181 attached to sleeve 171, thus effecting rotation of the truss about the principal axis. Rotation about the principal axis must be continuous during the day, at a mean speed of 15° per hour, but rotation about the swing axis (which accommodates the changing declination of the sun during the year) need only occur intermittently—an adjustment once every 15 minutes limits misalignment of the cone axis to a maximum of 15 seconds of arc which produces an undetectable departure from circularity of the sun's image at the energy receptor. Rotation about the swing axis as accomplished by gearing between a quadrant worm wheel 183 and a worm gear 184 on bearing 175 and a half spur gear on jacket 157. The gearing which is supported by brackets on hoop 170 consists of a pinion 185 running on a ring gear 186 and a set of bevel gears 187 taking the drive off at right angles into a solenoid activated reversing gear box 188 another set of bevel gears 189 after the reversing box again taking the drive through 90° to the sun gear of an epicyclic gear train 190 with a basic ratio of $-1$. The annulus gear of the epicyclic gear train 190 normally free wheels on the carrier shaft but when adjustment is required it can be locked by a solenoid activated dog clutch. This causes the planetary gear carrier to rotate which drives the worm 184 mating the worm wheel 183 thus swinging truss 115 about the swing axis. As truss 115 is fully balanced (the weight of the caustic cone arm is less than the weight of the cassegrainian support) very little power is required to operate the movements.

As disclosed previously, the boiler 120 is shrouded to minimise heat loss and the shroud 141 is a spherical metal shell surrounding the boiler 120 and supporting the sleeves 171 and 172. The surface of the shroud coincides with the circle of least confusion in the envelope of rays reflected from the caustic correction cone 116 and is silvered on its inside surface, apart from two diametrically opposed elongated slots 142 and 142 which admit radiation from the caustic correction cone 116 and the cassegrainian type collector 119. The slots 142 are covered by fused silica windows coated with a multi layer dielectric film to minimise reflection losses. The outer rim of sleeve 171 is equipped with a stuffing box type seal 195 against jacket 157 to provide an air tight seal.

The operation of the system is as follows:

At dawn on any day of the year the axis of truss 115 supporting the correction cone and cassegrainian system is aligned with a point on the horizon where the centre of the sun is expected to rise. (The cone is west of the central energy receptor). At sunrise rotation of truss 115 is initiated at a speed equal to the rotation of the earth with respect to the sun at the particular time of the year. In the southern hemisphere rotation is clockwise looking South. Because the axis of rotation is inclined above the horizontal at an angle equal to the latitude of the site the rotation maintains the cone axis aligned with the centre of the sun as it travels across the sky provided the angle between the cone axis and the rotational axis is altered every 15 minutes or so during the day so that it is maintained essentially equal to the sun's declination at any time. Corrections to rotational speed and axis angle are made automatically during the day in response to signals from a sensor on the caustic cone supporting arm. The sensor consists of a number of thermocouple junctions arranged in a ring around the reflected ray envelope at some point between the cone and the heat shroud. When the cone axis is correctly aligned the ray envelope is circular in cross-section at any point and passes through the ring of thermocouples without activating any of them. If a misalignment occurs the envelope becomes distorted and some of the thermocouple junctions will be heated causing currents to flow in those circuits affected. These currents are fed to a microprocessor which senses which segment of the ring they originate from and what corrective action is required to restore circularity. It then sends the appropriate signals to the circuits controlling current to the motors, eddy current brakes and solenoids. As soon as circularity is restored signals from the sensors stop and so does the corrective action, leaving rotation to continue at a constant speed until such time as further corrections are called up by the sensor ring.

When a group of dishes are working together only one needs to be equipped with sensors, micro-processor and control circuits—this acts as a "master dish" and the control wiring is arranged in such a way that all the other collectors in the group act precisely as the master dish acts.

While the cone axis is tracking the sun in a rather precise manner the reflecting shell is also being independently moved around its axis so that any time of the day it is facing in the general direction of the sun. The outcome is that practically continuously during the day the axis of the cone/cassegrainian system is pointing at the centre of the sun and for most of the day the cone/cassegrainian system is backed by the full effective hemispherical reflecting surface which is a zone subtending 127° at the centre of the hemisphere. Thus for most of the day all direct radiation from the sun on a circular area of $\pi$ (R sin 63.5)$^2$ units normal to the sun's rays and centered on the centre of the hemisphere is concentrated, minus reflection and other losses, on the central immobile energy receptor. (R=radius of the hemisphere). This radiation is absorbed by the energy receptor and converted to heat which is transferred through an insulated steam line in the form of essentially saturated steam at 600 p.s.i. to a central steam accumulator. A boiler circulating pump supplies water from the accumulator through an insulated main to the energy receptors in a field of concentrators. Saturated steam is drawn off the accumulator and passed at constant pressure through other concentrators where it is superheated to 850° F. Under these conditions the steam is suitable for utilisation in the turbine circuit of a thermal power station up to 30 megawatts capacity. A large field of collectors with extensive heat storage would be required to supply this amount of power alone but a hundred 20 meter diameter dishes in a 350 m×350 m array would supply 42,900 tonnes of steam per year at 600 p.s.i. and 850° F. to supplement the output of steam from the fossil fuel fired boilers of the power station. Where the boilers are fired by fuel oil this is an attractive economics proposition.

Another application is in the provision of high grade process heat. Future applications could be in the direct conversion of heat to electricity via thermionic converters. These devices have not been perfected at this time but they show good potential to achieve efficiencies of 40% at temperatures of 1000° to 1500° C. which is not much less than the best fossil fuel fired thermal stations. They would be best suited to operation in conjunction with concentrating solar collectors.

The criterion for the configuration of the caustic cone corrector and other optical features of the invention will now be discussed.

CAUSTIC CORRECTION CONE

The generating curve of the caustic correction cone 116 in parametric form is given below:

$$X = \frac{R}{2 \cos \theta} \left[ 1 + \frac{\sin 2(B - \theta)}{\sin 2(2\theta - B)} \cdot \cos 2\theta \right]$$

$$Y = R \sin \theta \cdot \frac{\sin 2(B - \theta)}{\sin 2(2\theta - B)}$$

where

R = radius of the sphere
$\theta$ = angle subtended at the centre of the sphere by an arc of the sphere in the plane of the co-ordinate system measured from the $X$ axis to the point where a ray parallel to the $X$ axis (the incident ray) intersects the sphere.
B = tan$^{-1}$ slope of the generating curve at the point ($X,Y$) corresponding to the point where the reflected ray resulting from the above incident ray intersects the generating curve.
   = $\theta + e^{\phi(\theta)}$ $\phi(\theta) = a \log\theta - b (\log\theta)^2 - (c \log\theta +$ $d) ( \sqrt{f(\log\theta)^2 + g \log\theta + h} \ ) - k \log (l \log\theta + m +$ $n \sqrt{f(\log\theta)^2 + g \log\theta + h} \ ) - p$ a = 2.97376
b = 0.255737
c = 0.205587
d = 0.0904155
f = 1.82801
g = 1.60789
h = 1.97494 k = 0.246541
l = 3.65602
m = 1.60789
n = 2.70408
p = 1.22642

Theta, $\theta$, is in radians and logs are to the base e

The limits of the generating curve are: X=0.830384, Y=0.3851 and X=0.585203, Y=0.0296916 based on a hemisphere of unit radius.

Figure 9:
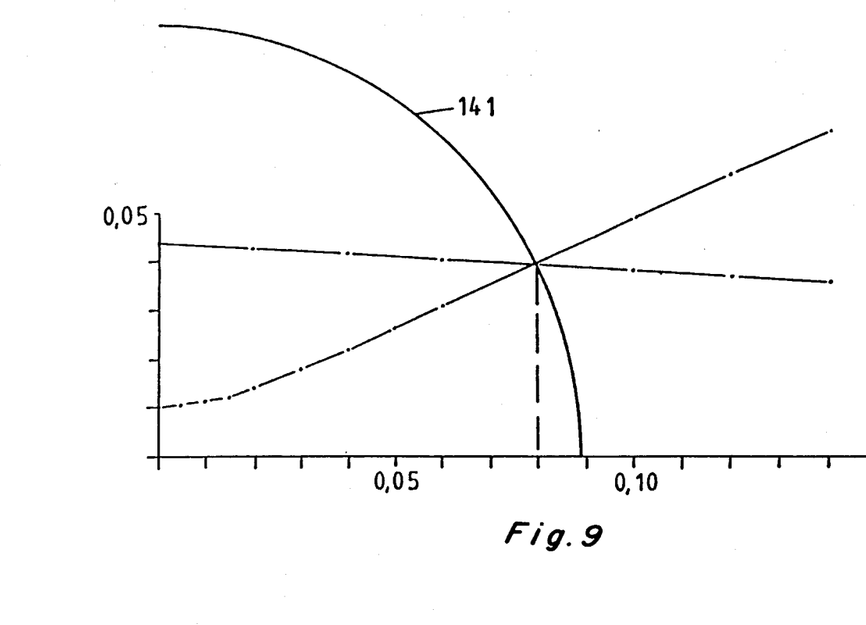
FIG. 9 is a half longitudinal section of two ray envelopes as reflected from the caustic correction cone of the third embodiment.

FIG. 9 depicts a half longitudinal section of two ray envelopes as reflected from the caustic correction cone. The origin of the rays is the periphery of the sun's disk when it has its maximum semi diameter of 16.3 minutes of arc. The steep envelope is formed by rays reflected from the maximum cicumference of the cone and the flat envelope is formed by rays reflected from the minimum circumference. It can be seen that the diameter of the sun's image as formed on a plane through the origin at right angles to the cone axis is 0.086 (for a hemisphere of unit radius) or 86 cm for a hemisphere of 20 m diameter. Also, the circle of least confusion occurs at a point on the X axis 80 cm from the centre of a 20 m diameter hemisphere. The circumference of the circle of least confusion is co-incident with the surface of a sphere 1.76 m diameter (for a 20 m diameter hemisphere) and this fixes the diameter of the heat shroud. The cone substrate is formed out of rigid self skinning polyurethane foam 10 mm thick. The density of the foam is 185 kg per cubic meter giving a total weight of the substrate of 98.4 kg. This weight can be moulded in one shot.

The silver reflecting surface is vacuum deposited on the face of the cone and protected by a clear acrylic film polymerized in place.

ANNULAR CONVEX SPHERICAL MIRROR

The equation of the generating curve of the annular convex spherical reflecting surface 121 backing the caustic correction cone is $$(X+1.33238)^2-(Y-0.926749)^2=4.97094$$

The limits are $X=0.830384$, $Y=0.3851$ and $X=0.793318$, $Y=0.254182$

This is formed as an integral part of the caustic correction cone in the one moulding operation.

AXIAL CONE

The equation of the generating curve for the axial cone 122 which redirects reflected radiation from annular spherical mirror 121 to the central energy receptor 120 is:

$$Y=1.7882X-0.980432$$

The limits are $X=0.869114$, $Y=0.0440965$ and $X=0.835488$, $Y=0.004458$

The substrate is glass 6 mm thick silvered on the inside surface. The silver film is protected by a coating of aliphatic polyurethane paint.

PARABOLOID

The generating curve of paraboloid 119A is:

$$y^2=-0.570392(x+0.2)$$

The limits are $x=-0.46$, $y=0.3851$ and $x=-0.2086026$, $y=0.07005$

The paraboloid is formed out of the same material and in the same manner as the cone.

HYPERBOLOID

The generating curve of the hyperboloid 119B is:

$$y^2=0.327036[(x+0.1713)^2-0.022112]$$

The limits are $x=-0.363956$, $y=0.07005$ and $x=-0.321265$, $y=0.0111511$

It is constructed of the same material as the axial cone 122 (ie; glass silvered on its inside surface).

CONVEX LENS

The generating curve of the spherical surface of the convex lens 123A is $$(x=0.481613)^2+y^2=0.0526$$

The limits are $x=-0.7$, $y=0.07005$ and $x=-0.710959$, $y=0$

The lens is 6.96 cm thick at its edge (for a 20 m diameter hemisphere) and the plane back is stepped inwards in a series of concentric zones to cut down weight. The lens is moulded from methyl methacrylate with a refractive index of 1.49 giving a focal length for paraxial rays of 4.6805 meters for a 20 m diameter hemisphere.

CONCAVE LENS

The concave lens 123B is made of glass of refractive index 1.46 and for a 20 m diameter hemisphere is 3.29 cm thick at the edge and 2.0 cm thick at the middle. The front surface is plane and the generating curve for the rear surface is $$(x+0.2731)^2+y^2=0.002131$$

The limits are $x=-0.317971$, $y=0.0108$ and $x=-0.319265$, $y=0$

The focal length for a hemisphere of 20 m diameter is 1.0036 meters.

It should be appreciated that the scope of this invention need not be limited to the particular scope of the embodiment described above.

I claim:

1. A solar collector comprising a substantially reflective concave surface having its reflective face inclined to a north-south horizontal axis by an angle substantially equal to the latitude of the location of the solar collector, a caustical conical concentrator located at the focus of said reflective concave surface and having a concentrated second focus for radiation reflected onto its surface from said reflective concave surface, a heat exchanger located at the second focus, said caustical conical concentrator being mounted to a support rotatable about said second focus along a substantially north-south axis and a substantially east-west axis, reflective concentrator means mounted on said support at the opposite side of said second focus from said caustical conical concentrator to shadow said caustical conical concentrator when both are in alignment with the sun, reflective concentrator means having its focus located at said second focus, and a drive means for maintaining said caustical conical concentrator and said reflective concentrator means in alignment with the sun.

2. A solar collector as claimed at claim 1 wherein the second focus is located at the centre of curvature of the concave surface.

3. A solar collector as claimed at claim 1 wherein said hemisphere is rotatable about said North-South axis.

4. A solar collector as claimed at claim 1 wherein the concave surface is inclined at an angle from the horizontal substantially equal to the angle of latitude of the location of the solar collector wherein the lower portion of the concave surface is fixed while the upper portion can rotate over the lower portion, a second drive being associated with the upper portion to move said upper portion such that said concave surface is substantially constantly directed towards the sun during its movement.

5. A solar collector as claimed at claim 1 wherein the caustic conical concentrator is associated with a sensor located adjacent the light path between the caustical conical concentrator and the second focus to cause activation of the drives for said caustical conical concentrator on said light path intersecting said sensor.

6. A solar collector as claimed at claim 1 wherein the reflective concave surface is a hemisphere of a spherical body and the other hemisphere thereof is substantially transparent.

7. A solar collector as claimed at claim 6 wherein the spherical collector is formed by a flexible membrane inflated to maintain its shape.

8. A solar collector as claimed at claim 6 wherein the spherical collector is formed of two hemispheres of rigid plastics material interconnected by a rigid circular frame supported by a diametric axial member.

9. A solar collector as set forth in claim 1 wherein the reflective concentrator means comprises an annular array of concentric parabolic reflectors.

10. A solar collector as set forth in claim 9 further including a lens supported in proximity to the concentral parabolic reflectors on the opposite side of the second focus.

11. A solar collector as set forth in claim 1 wherein the reflective concentrator means comprises an annular paraboloid reflector.

12. A solar collector as claimed at claim 1 wherein the caustical conical concentrator is associated with a concentric annular spherical reflector and a centrally located conical reflector located in the region of the base of said caustical conical concentrator wherein radiation reflected from the concave surface to the base of said caustical conical concentrator is reflected by said annular spherical reflector to said conical reflector and via said conical reflector to the heat exchanger through an opening in the top of said caustical conical concentrator.

* * * * *